(12) United States Patent
Damron et al.

(10) Patent No.: US 10,140,170 B2
(45) Date of Patent: *Nov. 27, 2018

(54) REPORTING ERRORS TO A DATA STORAGE DEVICE

(71) Applicant: International Business Machines Corporation, Armonk, NY (US)

(72) Inventors: Timothy M. Damron, Austin, TX (US); Justin K. King, Rochester, MN (US); Lee N. Helgeson, Rochester, MN (US); Michelle A. Schlicht, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 299 days.

This patent is subject to a terminal disclaimer.

(21) Appl. No.: 14/923,395

(22) Filed: Oct. 26, 2015

(65) Prior Publication Data

US 2017/0116067 A1   Apr. 27, 2017

(51) Int. Cl.
*G06F 11/07* (2006.01)
*G06F 9/455* (2018.01)
*H04L 12/24* (2006.01)

(52) U.S. Cl.
CPC ...... *G06F 11/0778* (2013.01); *G06F 9/45558* (2013.01); *G06F 11/0706* (2013.01);
(Continued)

(58) Field of Classification Search
CPC ............. G06F 11/0778; G06F 11/0751; G06F 11/0787; G06F 11/3476; G06F 11/3495;
(Continued)

(56) References Cited

U.S. PATENT DOCUMENTS 6,493,656 B1   12/2002  Houston et al.
7,293,203 B1   11/2007  Coatney et al.
(Continued)

FOREIGN PATENT DOCUMENTS

EP   1717811 A2   2/2006

OTHER PUBLICATIONS

Damron et al., "Reporting Errors to a Data Storage Device" U.S. Appl. No. 15/051,636, filed Feb. 23, 2016.
(Continued)

*Primary Examiner* — Phung M Chung
(74) *Attorney, Agent, or Firm* — Martin & Associates, LLC; Bret J. Petersen

(57) ABSTRACT

An error mechanism provides stored error information to assist in determining the cause of failure of a storage device such as a hard disk drive. The error mechanism gathers information surrounding an error event from various software and hardware components in the system. An event command is sent to the storage device that includes the gathered information. The storage device stores the gathered information from the event command in a log on the storage device. After the storage device is removed from the system the error information in the log can be used to determine the cause of the failure. The event command may be standardized into an existing industry communication protocol or be vendor specific.

13 Claims, 8 Drawing Sheets

(52) U.S. Cl.
CPC ...... *G06F 11/0712* (2013.01); *G06F 11/0781* (2013.01); *H04L 41/00* (2013.01); *G06F 2009/45579* (2013.01); *G06F 2009/45591* (2013.01)

(58) Field of Classification Search
CPC ........... G06F 17/30867; H04L 63/1416; H04L 2463/121; H04L 43/028; H04L 41/0816; H04L 51/12
See application file for complete search history.

(56) References Cited

U.S. PATENT DOCUMENTS

| | | |
|---|---|---|
| 7,805,630 B2 | 9/2010 | Kerner et al. |
| 7,996,724 B1 | 8/2011 | Coatney et al. |
| 8,345,367 B1 | 1/2013 | Tharumalingam |
| 8,843,781 B1 | 9/2014 | Chiang et al. |
| 2011/0004446 A1* | 1/2011 | Dorn ...................... G01D 4/002 702/188 |
| 2014/0012954 A1* | 1/2014 | Dorn ...................... G01D 4/002 709/219 |

OTHER PUBLICATIONS

Appendix P—List of IBM Patents or Patent Applications Treated As Related.
S.M.A.R.T., Wikipedia, printed Jul. 8, 2015.
smartd(8)—Linux man page, printed Jul. 8, 2015.
Hill et al., "Hardware and Volume Statistical Analysis and Reporting System for Detecting and Isolating Media and Hardware Errors on the Magstar Family of Tape Drives", ip.com article, 000013086, Dec. 1, 1999.
IBM, "Method and apparatus of conflict reduction in multisource data synchronization", ip.com article, 000192673, Jan. 28, 2010.
"How to Detect a Failing Hard Drive", Mike's Technology and Finance Blog, http://mikemstech.blogspot.com/, Dec. 12, 2011.
Mohr, Josef, Graphical Representation of Permanent Defects in Hard Disk Drives, Proceedings of the 24th International Symposium for Testing and Failure Analysis, p. 179-183, Nov. 1, 1998.

* cited by examiner

REPORTING ERRORS TO A DATA STORAGE DEVICE

BACKGROUND

1. Technical Field

This invention generally relates to data storage in a computing environment, and more specifically relates to reporting errors to a data storage device and storing error information on the data storage device such that the error information is available later to assist in determining the cause of the error.

2. Background Art

Cloud computing is a common expression for distributed computing over a network and can also be used with reference to network-based services such as Infrastructure as a Service (IaaS). IaaS is a cloud based service that provides physical processing resources to run virtual machines (VMs) as a guest for different customers. The virtual machine may host a user application or a server.

A computing environment, such as a cloud computing environment, may have a large number of data storage devices. Data storage devices typically have higher failure rates than other components of the computing system. In many cases, the host computer detects an issue with a drive, and the drive is sent back to the manufacturer. However, the manufacturer often sees no issues with the drive and is unable to determine the cause of the failure.

BRIEF SUMMARY

An apparatus and method reports error information to assist in determining the cause of failure of a storage device such as a hard disk drive. An error mechanism gathers information surrounding an error event from various software and hardware components in the system. An event command is sent to the storage device that includes the gathered information. The storage device stores the gathered information from the event command in a log on the storage device. After the storage device is removed from the system the error information in the log can be used to determine the cause of the failure. The event command may be standardized into an existing industry communication protocol or may be vendor specific.

The foregoing and other features and advantages of the invention will be apparent from the following more particular description of preferred embodiments of the invention, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

Figure 1:
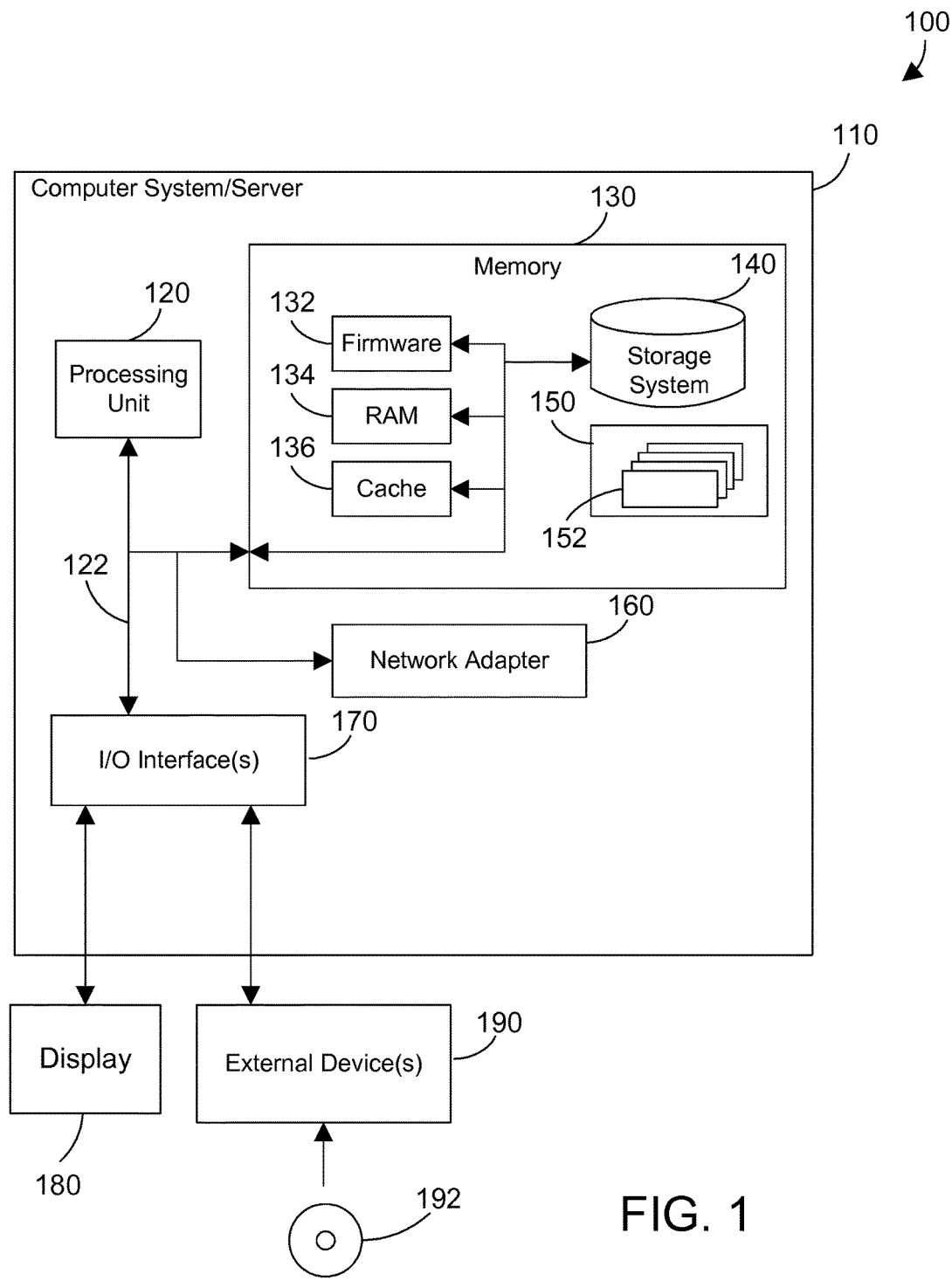
FIG. 1 is a block diagram of a cloud computing node.

The claims and disclosure herein describe reporting error information to assist in determining the cause of failure of a storage device such as a hard disk drive. An error mechanism gathers information surrounding an error event from various software and hardware components in the system. An event command is sent to the storage device that includes the gathered information. The storage device stores the gathered information from the event command in a log on the storage device. After the storage device is removed the gathered information can be used to determine the cause of the failure. The event command may be standardized into an existing industry communication protocol or may be vendor specific.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processor 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media.

System memory 130 can include computer system readable media in the form of volatile, such as firmware 132, random access memory (RAM) 134, and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, RAID systems, tape drives, data archival storage systems, etc.

Figure 2:
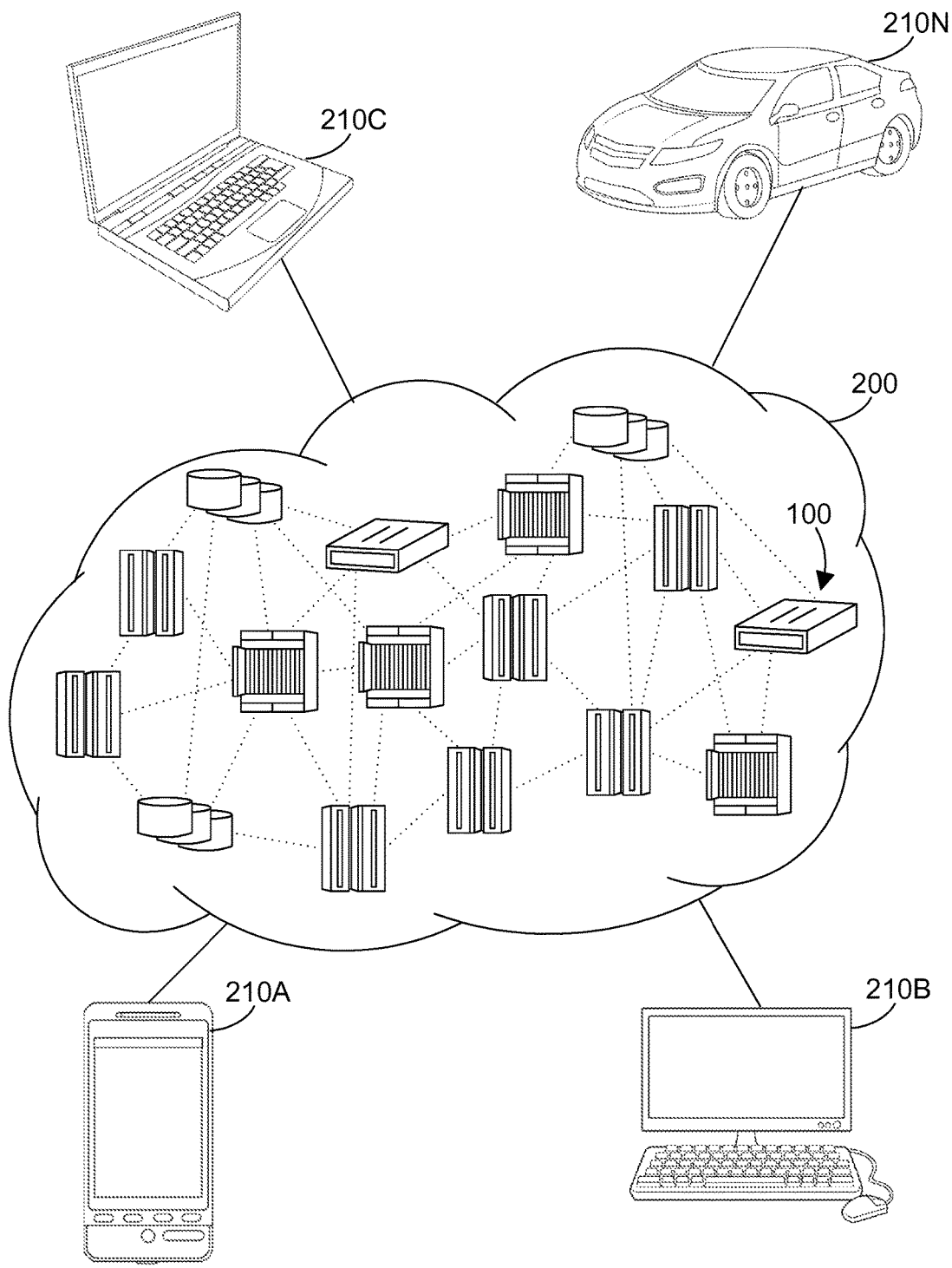
FIG. 2 is a block diagram of a cloud computing environment.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
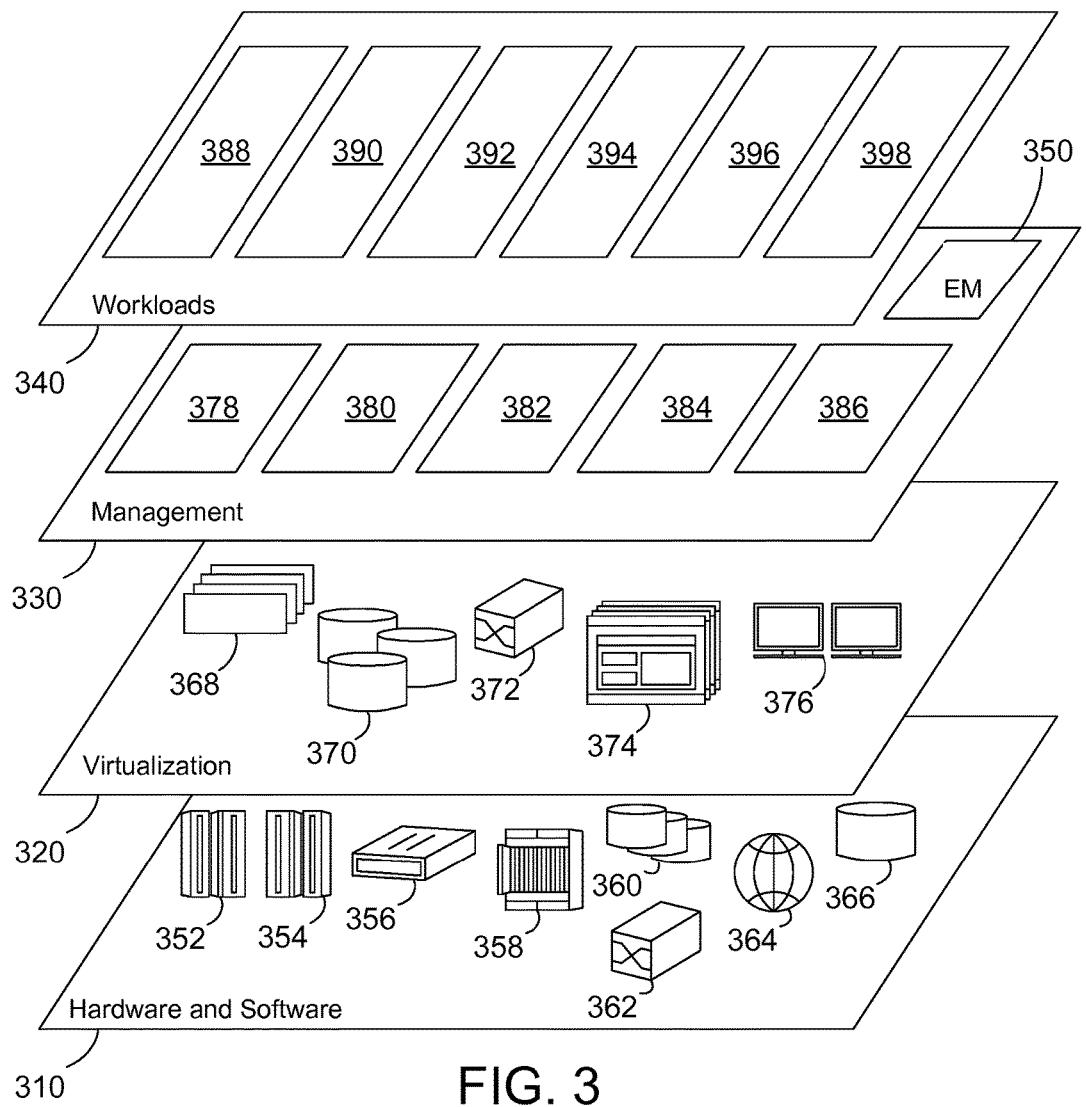
FIG. 3 is a block diagram of abstraction model layers.

Referring now to FIG. 3, a set of functional abstraction layers provided by cloud computing environment 200 (FIG. 2) is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes 352; RISC (Reduced Instruction Set Computer) architecture based servers 354; servers 356; blade servers 358; storage devices 360; and networks and networking components 362. In some embodiments, software components include network application server software 364 and database software 366.

Virtualization layer 320 provides an abstraction layer from which the following examples of virtual entities may be provided: virtual servers 368; virtual storage 370; virtual networks 372, including virtual private networks; virtual applications and operating systems 374; and virtual clients 376.

In one example, management layer 330 may provide the functions described below. Resource provisioning 378 provides dynamic procurement of computing resources and other resources that are utilized to perform tasks within the cloud computing environment. Metering and Pricing 380 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 382 provides access to the cloud computing environment for consumers and system administrators. Service level management 384 provides cloud computing resource allocation and management such that required service levels are met. Service Level Agreement (SLA) planning and fulfillment 386 provide pre-arrangement for, and procurement of, cloud computing resources for which a future requirement is anticipated in accordance with an SLA. The management layer further includes an error mechanism (EM) 350 as described herein. While the EM 350 is shown in FIG. 3 to reside in the management layer 330, the EM 350 actually may span other levels shown in FIG. 3 as needed.

Workloads layer 340 provides examples of functionality for which the cloud computing environment may be utilized. Examples of workloads and functions which may be provided from this layer include: mapping and navigation 386; software development and lifecycle management 390; virtual classroom education delivery 392; data analytics processing 394; transaction processing 396 and mobile desktop 398.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
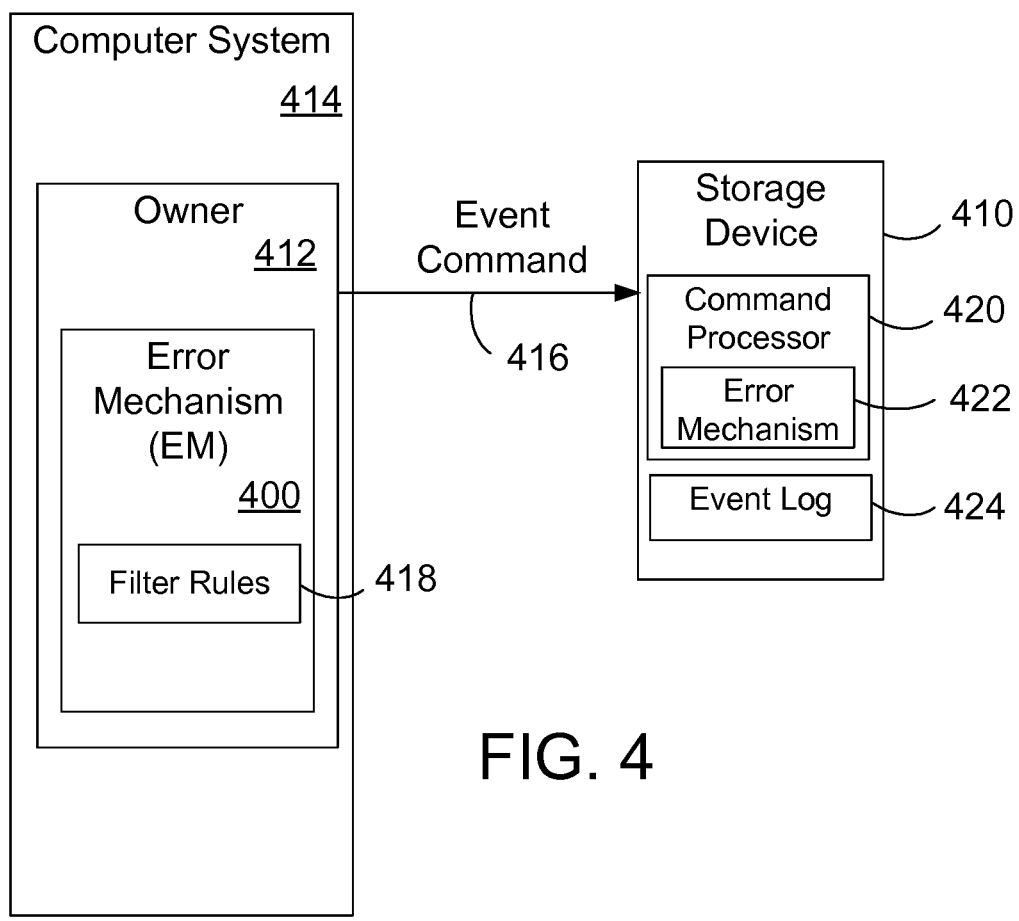
FIG. 4 is a block diagram that illustrates a system with an error mechanism as described herein for reporting errors to a data storage device.

Referring now to FIG. 4, a block diagram illustrates a simplified system with an error mechanism (EM) 400. In this example, the EM 400 is described in a generic computer system 414. Computer system 414 represents a system such as computing system 110 shown in FIG. 1 but not necessarily part of a cloud computing system. In this example, the EM 400 may be a program module 152 as introduced in FIG. 1. The EM 400 reports errors to a data storage device 410. The EM 400 resides within owner 412. The owner 412 is the logical owner of the storage device 410. The owner 412 is typically a software entity such as an operating system that controls accesses to the storage device 410. The owner 412 could also be hardware. In this example, the owner 412 is software residing on hardware of computer system 414. The EM 400 gathers information surrounding an error event from various software and hardware components in the computer system 414 and sends an event command 416 to the storage device 410 where the event command 416 includes the gathered error information. The EM 400 may use filter rules 418 to determine what error events to report to the storage device 410 as described further below. The storage device 410 processes the event command with error mechanism 422 residing in the storage device 410. The term "error mechanism" as used herein thus may include both portions, EM 400 residing in the computer system 414 and EM 422 residing in the storage device 410. The EM 422 residing in the storage device 410 may be part of a command processor 420 that process normal data input/output of the storage device as known in the prior art. The EM 422 in the command processor 420 stores the information from the event command 416 in an event log 424 on the storage device 410. After the storage device 410 is physically and/or logically removed from the computer system, the information stored in the event log 424 can help troubleshoot the cause of the failure of the storage device.

Figure 5:
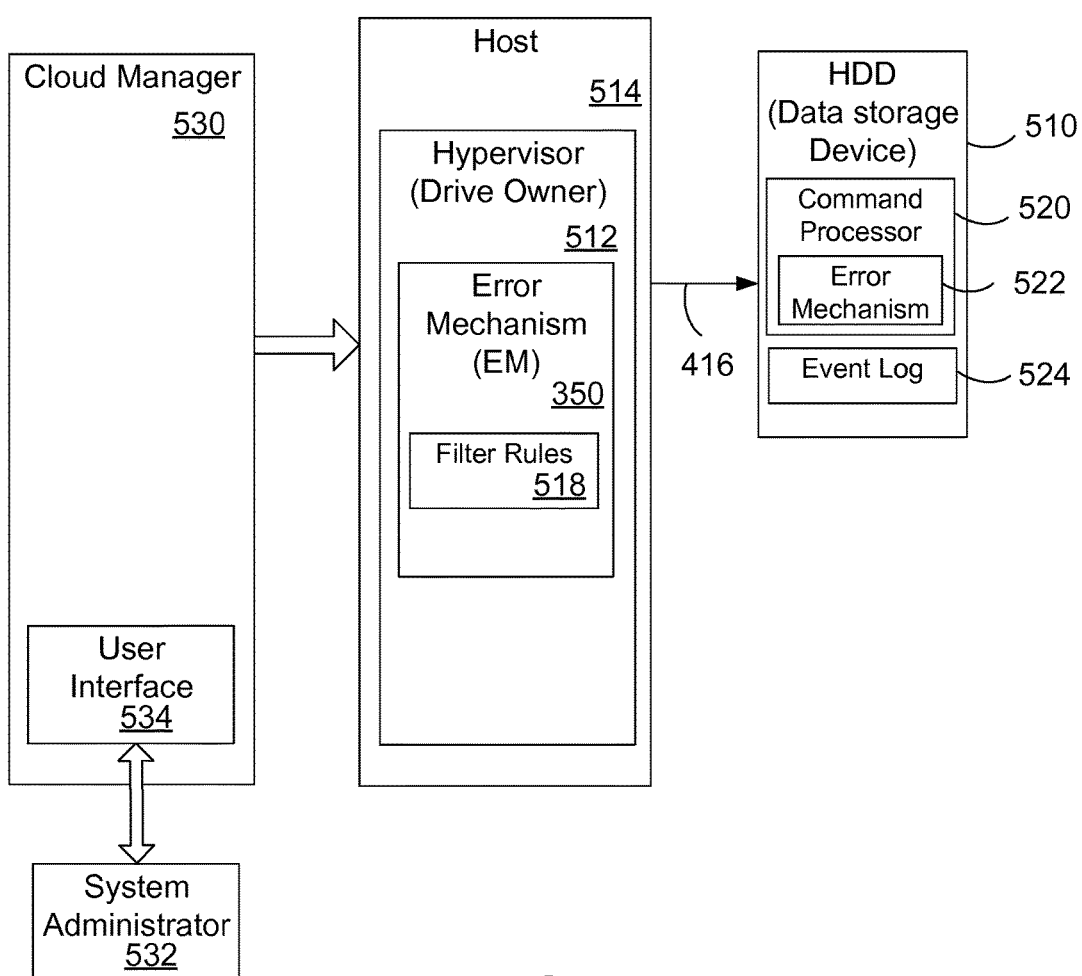
FIG. 5 is a block diagram that illustrates a system in a cloud environment with an error mechanism for reporting errors to a data storage device.

Referring now to FIG. 5, a block diagram illustrates another simplified system with an error mechanism similar to that described in FIG. 4. In this example, the EM 350 is part of a cloud computing system as described above with reference to FIG. 3. The EM 350 reports errors associated with a data storage device. In this example, the data storage device is a hard disk drive (HDD) 510. The EM 350 resides within a hypervisor 512 which is the logical owner of the HDD 510. In this example, the hypervisor 512 is software residing on hardware of host computer system 514. The EM 350 gathers information surrounding an error event from various software and hardware components in the host computer system 514 and sends an event command 416 to the HDD 510 where the event command 416 includes the gathered information. The EM 350 may use filter rules 518 to determine what error events to report to the storage device 410 as described further below. The HDD 510 processes the event command with a portion of the EM 522 residing in the storage device 510. The term error mechanism as used herein thus may include both portions, EM 350 and EM 522. The EM 522 residing in the HDD 510 may be part of a command processor 520 that process normal data input/output of the HDD 510 as known in the prior art. The EM 522 in the command processor 520 stores the information from the event command 416 in an event log 524 on the HDD 510. After the HDD 510 is removed from use, the information stored in the event log 524 can be used to determine the cause of the failure.

Referring again to FIG. 5, the system further includes a cloud manager 530. The cloud manager 530 may be similar to cloud managers known in the prior art but includes the additional features as described herein. The cloud manager 530 allows a human user or system administrator 532 to set up and manage computer resources through a user interface 534. The cloud manager 530 implements the cloud management functions 330 described above with reference to FIG. 3. The cloud manager 530 allows the system administrator 532 to set up and manage physical computer resources. In the illustrated example, the computer resources include the host computer 514. The cloud manager 530 may further allow the system administrator 532 to set up the filter rules 518 as described further below.

As introduced above with respect to FIG. 5, the EM 350 reports errors that are associated with a data storage device 410 with an event command 416 to the HDD 510. The EM 350 may first determine whether the storage device or disk drive supports logging host error events. This may be done at "boot" time or whenever the storage device is initially set up. This may be done by accessing the device with a command of the specified format and looking for the proper response. If the logging of host events is supported on the storage device, then the EM 350 may continue by communicating with the other software and hardware components in the system to instruct the other components to report detected errors and pertinent error information to the EM 350. The EM 350 may also synchronize clocks of the system components to ensure error information that is reported is synchronized. When detected events are reported, the EM 350 may filter the detected events as described further below before sending an event command to the storage device.

Again referring to FIG. 5, an event command is received and processed by the error mechanism 522 residing on the storage device as introduced above. The error mechanism 522 first receives the event command in an appropriate format from the error mechanism 350 on the host 514. The error mechanism 522 then processes the event command 416. The error mechanism 522 may take some action according to the event command where appropriate. For example, if a power glitch was detected, the drive may switch any write-back caching it is doing to do write-through caching. In another example, if a thermal situation is detected external to the drive, the drive speed could be reduced. The error mechanism then stores the information about the event from the event command in the event log 524 on the storage device for later failure analysis.

Figure 6:
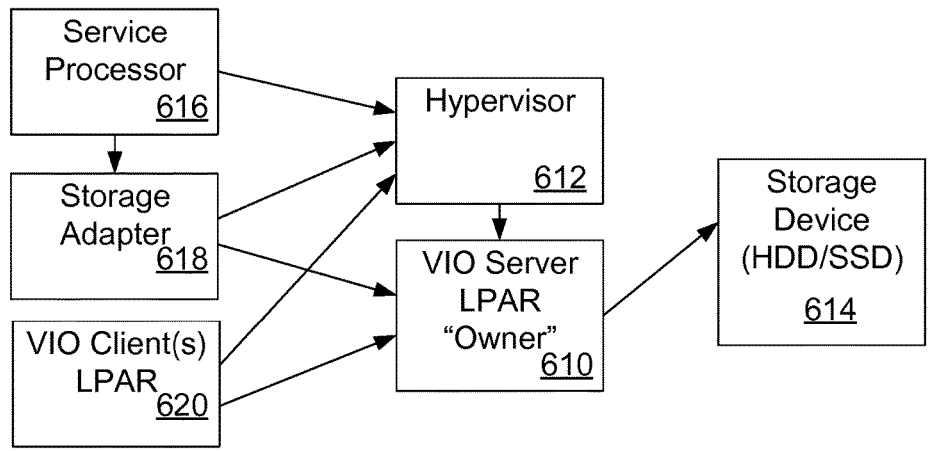
FIG. 6 is a block diagram that illustrates notification paths for an error mechanism for reporting errors to a data storage device in an LPAR environment.

As introduced above, the EM 350 communicates with various components of the system to gather information surrounding error events to send to the data storage device. The paths of communication to the EM 350 may vary depending on the environment. FIG. 6 is a block diagram that illustrates a first example of notification for a first environment. These notification paths can be used to send information and system errors that can be used to troubleshoot errors of the storage device to the EM 350. The example shown in FIG. 6 is for a logical partition (LPAR) environment. A LPAR environment uses systems and/or software by International Business Machines, Inc. In this environment, a VIO server 610 is a dedicated LPAR that is assigned to handle virtual input/output to a storage device 614. The VIO server 610 operates under the control of the hypervisor 612. The components that can communicate error information concerning the storage device 614 include a service processor 616, a storage adapter 618 and one or more VIO clients 620. The service processor is a processor that is not within the hypervisor and is used for basic services in the physical host computer. The service processor 616 can communicate directly with the hypervisor 612 or with the storage adapter 618. The storage adapter 618 can communicate with the hypervisor 612 or the VIO server 610. The VIO clients 620 can communicate with the hypervisor 612 or the VIO server 610. The VIO server 610 communicates with the storage device 614 and passes the error event commands as described herein.

Figure 7:
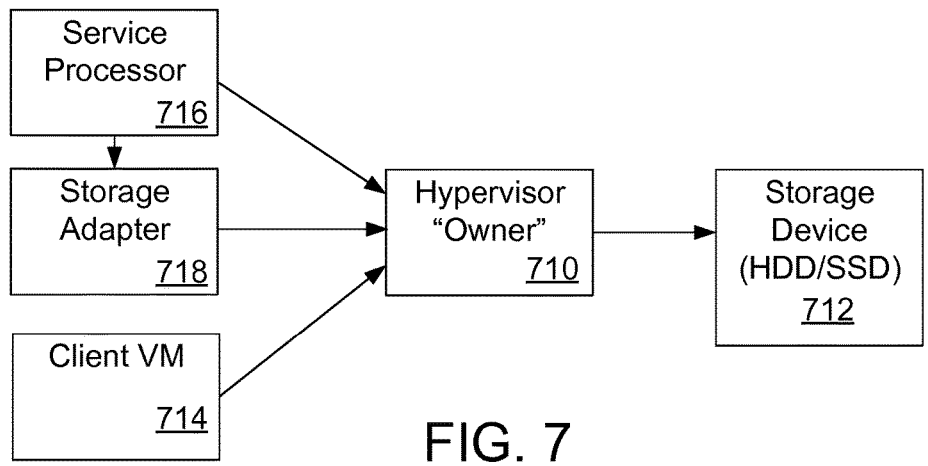
FIG. 7 is a block diagram that illustrates notification paths for an error mechanism for reporting errors to a data storage device in a virtualized environment.

FIG. 7 is a block diagram that illustrates another example of notification paths for the EM 350 to receive error reports. This example is for a logical virtual machine in an environment on a typical x86 virtualization platform. In this environment, the hypervisor 710 is the owner of the storage device 712. The hypervisor 710 controls one or more client virtual machines (VM) 714. The components that can communicate error information concerning the storage device 712 include a service processor 716, a storage adapter 718 and one or more clients VMs 714. Similar to the previous example, the service processor 716 can communicate directly with the hypervisor 710 or with the storage adapter 718. The storage adapter 718 communicates with the hypervisor 710. The client VMs 714 communicate with the hypervisor 710. The hypervisor 710 communicates with the storage device 712 and passes the error event commands as described herein.

FIGS. 6 and 7 show paths of communication from various components to the EM 350 for notification of an error event. These paths of communication are typically available in the systems as described above. Each of the various components may report different errors on these paths. Examples of the types of events these various components may report to the EM 350 may include many different events. For example, the service processor 616, 716 my report power glitches, system power use (eg, periodic messages to record average/max power use), and host system information (serial number, model number, etc). The hypervisor 612 may report a power on/off of a VIO client 620, or a crash of a VIO client 620. The VIO Server 610 may report a VIO client connect/disconnect, and occasional data statistics. If the VIO server 610 is the drive owner, then it may also report any peripheral component interconnect (PCI) errors. The VIO client 620 and the Client VM 714 may report virtual disk information (creation/deletion/resizing), and errors in reported data. The disk storage adapter 618, 718 may report PCI errors, hardware configuration errors, etc. Each of these errors can be processed by the EM 350 to create an event command to send to the storage device for logging of the error as described herein.

Figure 8:
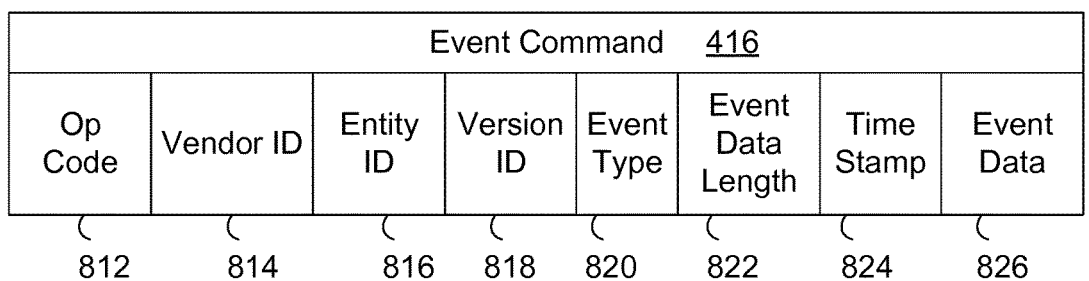
FIG. 8 is a block diagram that illustrates an example structure for an event command.

FIG. 8 is a block diagram that illustrates an example of a possible format for the event command 416 introduced above with reference to FIG. 4. The format of the event command 416 may be a proprietary format of a computer vendor, or it could be incorporated into an industry standard. For example, the event command 416 could be incorporated into the Small Computer System Interface (SCSI) standards developed by the American National Standards Institute. The established SCSI command format has a one byte operation code, and a variable length block with command parameters depending on the operation code. A special operation code 812 could be incorporated into the SCSI standard to indicate this data structure is an event command 416 for an externally initiated log entry as described herein. The remaining parameters for the event command 416 may then include the followings: a vender identification (ID) 814, an entity ID 816, a version ID 818, an event type 820, an event data length 822, a time stamp 824 and event data 826. The vendor ID 814 identifies the vendor of the hardware or software entity creating the log entry. The entity ID 816 identifies the piece of hardware or software creating the log entry. For example, the entity ID 816 could be a hypervisor, an operating system or a storage adapter. The version ID 818 identifies the version of the entity identified by the entity ID 816. The event type 820 identifies the type of event that is being reported by the event command 416. Some event types might be standardized (eg, values 0-63), while others might be specific to the vendor or entity (eg, values 64-255). The event data length 822 indicates size of the data block stored in event data 826. The timestamp 824 identifies the time that the event happened, and may be synchronized to the disk's time system. The event data 826 includes the error information stored in the event command 416.

As introduced above with reference to FIG. 4, the EM 350 may filter detected events based on filter rules 518. The filter rules 518 provide a way for the EM 350 to determine what events to report and to which data storage device to report the event. The filter rules may be set or altered by the system administrator 532. For example, a filter rule may indicate to store any power glitch error to all the data storage devices 510. While this type of error is not directly related to a data storage device error, it may provide useful information in conjunction with other errors reported at the same time. As another example, the filter rules 518 may indicate to store errors reported by a storage adapter (618, 718 in FIGS. 6 and 7). If the error reported by a storage adapter originated from a storage device, the error would preferably be sent only to the storage device that reported the error. Another example of a filter rule would be a "set negative" rule that excludes notifications pushed to the drive to prevent the drive's log from being filled with useless information. For example, a "set negative" rule may be used for a system that is constantly being powered on and off and where it would be useful to exclude this notification from being logged.

Figure 9:
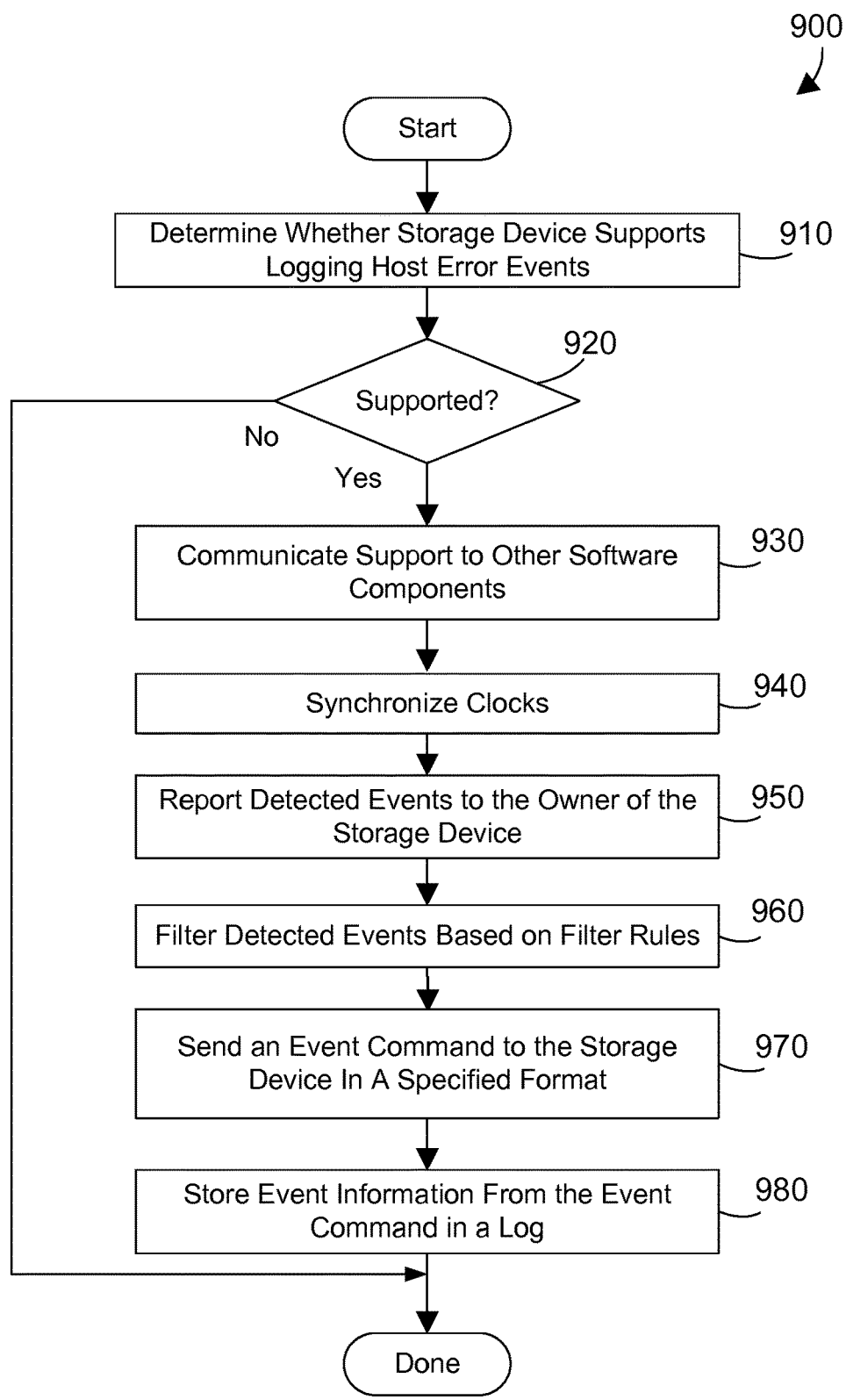
FIG. 9 is a flow diagram of a method for reporting errors to a data storage device.

FIG. 9 illustrates a flow diagram of a method 900 for reporting errors to a data storage device. The method 900 is presented as a series of steps performed by a computer software program such as the error mechanism 350 and 522 described above. First, determine whether the storage device or disk drive supports logging host error events (step 910). If the logging of host error events is not supported on the storage device (step 920=no) then the method is done. If the logging of host error events is supported on the storage device (step 920=yes) then communicate the determined support to other software components in the system (step 930). Next, synchronize clocks of the system to ensure error information is reported in synchronization (step 940). Report detected events to the owner of the storage device or drive (step 950). Filter the detected events based on the filter rules (step 960). When an error occurs, send an event command to the storage device in a specified format (step 970). Then store event information from the event command in a log on the storage device (step 980). The method is then done.

Figure 10:
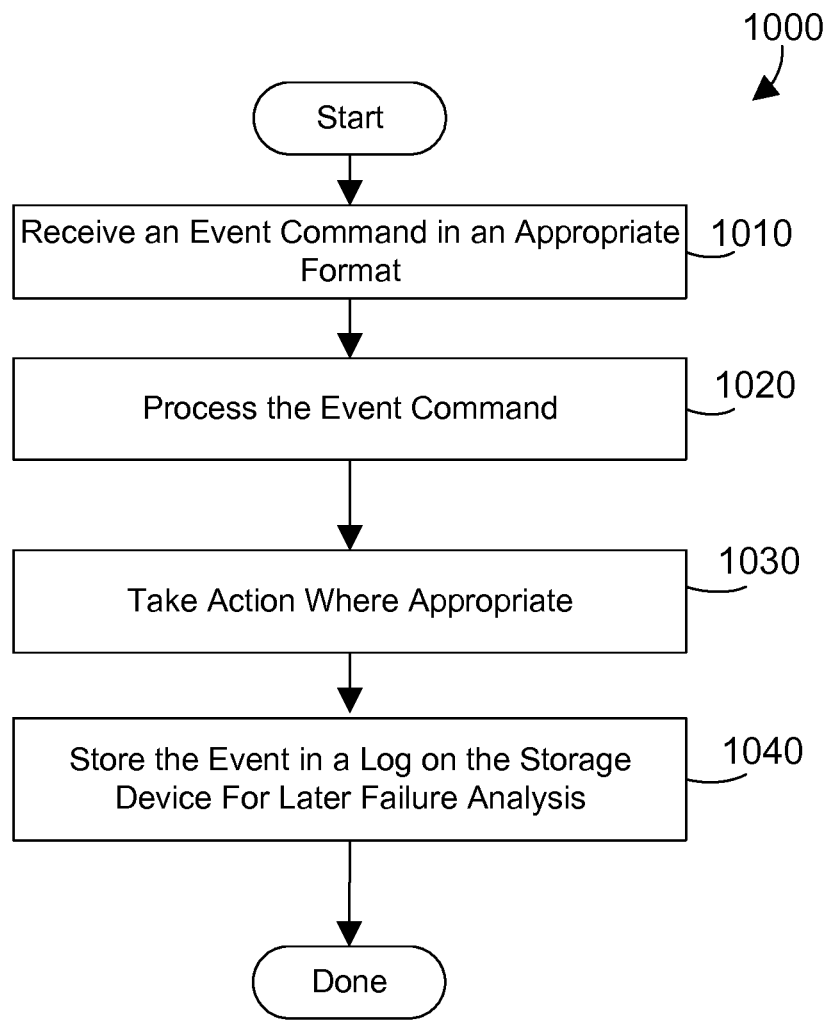
FIG. 10 is a flow diagram of an example method for step 980 in FIG. 9.

Referring now to FIG. 10, a flow diagram shows method 1000 that is an exemplary method for performing step 980 in method 900. The method 1000 is presented as a series of steps performed by a computer software program such as the error mechanism 522 described above. First, receive an event command in an appropriate format (step 1010). Then process the event command (step 1020). Take action according to the event command where appropriate (step 1030). Store the event from the event command in a log on the storage device for later failure analysis (step 1040). The method is done.

The claims and disclosure herein provide an apparatus and method for reporting errors to a data storage device and storing error information such that the error information is available to more efficiently and accurately determine the cause of the error.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A computer-implemented method for reporting errors to a data storage device, the method comprising:
    reporting detected error events associated with the storage device to an owner of the storage device;
    in response to a detected error event, sending an event command to the storage device in a specified format; and
    storing error event information from the event command in a log on the storage device;
    filtering detected events based on filter rules;
    determining whether the storage device supports logging host error events;
    when the storage device supports logging host error events, then communicating support of logging error events by the data storage device to system components; and
    allowing a system administrator to define the filter rules that indicate what errors to report and log on the data storage device.

2. The method of claim 1 further comprising:
    receiving the event command in an appropriate format;
    processing the event command; and
    storing information about an event from the event command in an event log.

3. The method of claim 1 wherein the steps are performed by a part of a management layer of a cloud computing environment.

4. The method of claim 1 wherein the steps are performed on an entity that is an owner of the data storage device.

5. The method of claim 1 wherein the event command is processed in the data storage device to recognize the event command and store information from the event command in the log.

6. The method of claim 1 wherein the owner of the data storage device receives error information from various components in the system including a service processor, a storage adapter and a virtual machine client.

7. The method of claim 1 wherein the event command satisfies an industry standard.

8. The method of claim 1 wherein the event command includes blocks chosen from the following: an operation code, a vendor ID, and entity ID, a version ID, an event type, an event data length, a time stamp and event data.

9. The method of claim 1 wherein the detected error events are detected by software and hardware components in the system and reported to the owner of the storage device.

10. The method of claim 9 wherein the software and hardware components in the system that detect and report the detected error events comprise: a service processor, a storage adapter, and a client virtual machine.

11. A computer-implemented method for reporting errors to a data storage device, the method comprising:

reporting detected error events associated with the storage device to an owner of the storage device;

filtering the detected error events based on filter rules to produce filtered detected events;

in response to a detected error event, sending an event command with the filtered detected events to the storage device in a specified format;

storing error event information from the event command in a log on the storage device;

determining whether the storage device supports logging host error events;

when the storage device supports logging host error events, then communicating support of logging error events by the data storage device to system components;

synchronizing clocks of system components;

allowing a system administrator to define the filter rules that indicate what errors to report and log on the data storage device; and wherein the event command includes blocks chosen from the following: an operation code, a vendor ID, and entity ID, a version ID, an event type, an event data length, a time stamp and event data.

12. The method of claim 11 wherein the detected error events are detected by software and hardware components in the system and reported to the owner of the storage device.

13. The method of claim 12 wherein the software and hardware components in the system that detect and report the detected error events comprise: a service processor, a storage adapter, and a client virtual machine.

* * * * *